US005376321A

United States Patent [19]

Uchida et al.

[11] Patent Number: 5,376,321

[45] **Date of Patent: * Dec. 27, 1994**

[54] METHOD OF PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[ * ] Notice: The portion of the term of this patent subsequent to Nov. 29, 2011 has been disclaimed.

[21] Appl. No.: 750,618

[22] Filed: Aug. 27, 1991

[30] Foreign Application Priority Data

Aug. 27, 1990 [JP] Japan .................................. 2-222536
Aug. 27, 1990 [JP] Japan .................................. 2-222537

[51] Int. Cl.[5] ............................................. B29C 39/12

[52] U.S. Cl. ........................................ 264/60; 264/86; 264/113; 264/245; 264/313; 264/317; 264/333; 264/73

[58] Field of Search ................... 264/73, 316, 308, 31, 264/73, 113, 245, 317, 333, 35, 255, 313, 63, 86, 60; 249/61, 112, 113; 425/84

[56] References Cited

U.S. PATENT DOCUMENTS

| | | | |
|---|---|---|---|
| 259,863 | 6/1882 | Jewell | 264/73 |
| 537,703 | 4/1895 | Mueller | 264/245 |
| 699,588 | 5/1902 | Stevens | 264/308 |
| 723,281 | 3/1903 | Jacques | 264/256 |
| 797,906 | 8/1905 | Moore | 249/155 |
| 827,287 | 7/1906 | Bidtel | 264/31 |
| 1,019,414 | 3/1912 | Bellamy | 264/245 |
| 1,105,950 | 8/1914 | Andersen | 264/73 |
| 1,120,632 | 12/1914 | Schlattner | 264/71 |
| 1,453,382 | 5/1923 | D'Alessandro et al. | 264/245 |
| 1,524,824 | 2/1925 | Henroz | 264/245 |
| 1,597,373 | 8/1926 | Grimm | 264/245 |
| 1,641,404 | 9/1927 | Washington | 264/245 |
| 1,666,232 | 4/1928 | Boynton | 264/246 |
| 2,007,961 | 7/1935 | Bolton | 264/333 |
| 2,136,022 | 11/1938 | Rossow | 264/317 |
| 2,266,646 | 12/1941 | Lower | 264/73 |
| 2,389,836 | 11/1945 | Berger | 264/73 |
| 2,434,477 | 1/1948 | Winter | 264/245 |
| 2,665,469 | 1/1954 | Hymel | 264/308 |
| 3,414,642 | 12/1968 | Baum | 264/73 |
| 3,484,514 | 12/1969 | Longinotti | 264/308 |
| 3,492,391 | 1/1970 | Atten | 264/316 |
| 3,507,940 | 4/1970 | Gard | 264/73 |
| 3,507,946 | 4/1970 | Gard et al. | 264/73 |
| 3,515,619 | 6/1970 | Barnette | 264/316 |
| 3,975,480 | 8/1976 | Walters | 264/113 |
| 4,700,518 | 10/1987 | Akihama et al. | 52/309.17 |
| 4,787,597 | 11/1988 | Yokota et al. | 249/113 |
| 4,894,004 | 1/1990 | Brault | 264/308 |
| 4,938,675 | 7/1990 | Contreras et al. | 249/155 |
| 5,009,387 | 4/1991 | Scott et al. | 264/35 |

FOREIGN PATENT DOCUMENTS

| | | |
|---|---|---|
| 73377/74 | 3/1976 | Australia . |
| 389851 | 2/1990 | Austria . |
| 391297 | 10/1932 | Belgium . |
| 0000837 | 2/1979 | European Pat. Off. . |
| 0374956 | 6/1990 | European Pat. Off. . |

*Primary Examiner*—Jay H. Woo
*Assistant Examiner*—Robert B. Davis
*Attorney, Agent, or Firm*—Oblon, Spivak, McClelland, Maier, & Neustadt

[57] ABSTRACT

A method of producing a patterned shaped article includes the steps of constituting a patterning form by disposing at a prescribed position within a main form for molding the shaped article an auxiliary form of a configuration appropriate for a pattern to be formed, charging a dry material for pattern formation into the patterning form at a prescribed form cavity portion thereof, charging a base-course material for forming the base course of the shaped article into the remaining space of the patterning form not filled with the pattern material, removing the auxiliary form, causing the pattern material and base-course material charged into the patterning form to set into a shaped article, removing the shaped article from the main form and, optionally, sintering the shaped article.

42 Claims, 8 Drawing Sheets

METHOD OF PRODUCING PATTERNED SHAPED ARTICLE

BACKGROUND OF THE INVENTION

1. Field of the Invention

This invention relates to a method of producing patterned shaped articles including shaped concrete articles and shaped artificial stone articles such as paving blocks and the like used for surfacing sidewalks and roads, and wall, ceiling and floor slabs used for building purposes, and shaped ceramic articles such as paving tiles, wall tiles, porcelain wares, sintered rock, glass, flameproof materials and other structural materials.

2. Prior Art Statement

The conventional method of providing a paved surface constituted of paving blocks with a pattern indicating, for example, a crosswalk, a stop intersection or other such traffic control mark has been either to apply paint to the surface in the desired pattern or to inlay the surface with another material in the desired pattern. On the other hand, the patterning of ceramic material surfaces has conventionally been carried out exclusively by pattern transfer, printing or inlaying.

Since the patterns painted on the surface of paving blocks are exposed to abrasion from pedestrians' shoes and/or vehicle tires and the like, they quickly wear off and have to be redone at frequent intervals, at a considerable cost in terms of labor and materials. Where the pattern is formed by inlaying, the work itself is troublesome and very costly.

The object of the present invention is to provide a method for easily producing patterned shaped articles capable of maintaining their patterns in excellent condition even when exposed to surface abrasion.

SUMMARY OF THE INVENTION

For realizing this object, the present invention provides a method of producing a patterned shaped article comprising the steps of constituting a patterning form by disposing at a prescribed position within a main form for molding the shaped article an auxiliary form of a configuration appropriate for a pattern to be formed, charging a dry material for pattern formation into the patterning form at a prescribed form cavity portion thereof, charging a base-course material for forming the base course of the shaped article into the remaining space of the patterning form not filled with the pattern material, removing the auxiliary form, causing the pattern material and base-course material charged into the patterning form to set into a shaped article, removing the shaped article from the main form and, optionally, sintering the shaped article.

When a pattern material and a base-course material consisting mainly of cement and/or resin are charged into the patterning form and allowed to set into an integral mass by virtue of their water content, there is obtained a patterned concrete shaped article.

When a pattern material and a base-course material consisting mainly of aggregate are charged into the patterning form and caused to set into an integral mass by use of a curing material, there is obtained a patterned artificial stone shaped article.

Moreover, when a pattern material and a base-course material consisting mainly of sinterable material are charged into the patterning form, the charged materials are formed under pressure into a raw product, and the unmolded raw product is sintered, there is obtained a patterned ceramic shaped article.

Since the pattern course of the patterned shaped article produced according to the method of this invention can be formed to whatever thickness is desired, the pattern does not wear off or become unsightly even when the surface of the shaped article is subjected to abrasion or fouling. In addition, as explained above, the patterning form is constituted by disposing an auxiliary form in a main form and, therefore, it becomes possible to produce even complexly patterned shaped articles with ease.

The above and other features of the present invention will become apparent from the following description made with-reference to the drawings.

DESCRIPTION OF THE PREFERRED EMBODIMENTS

Figure 1:
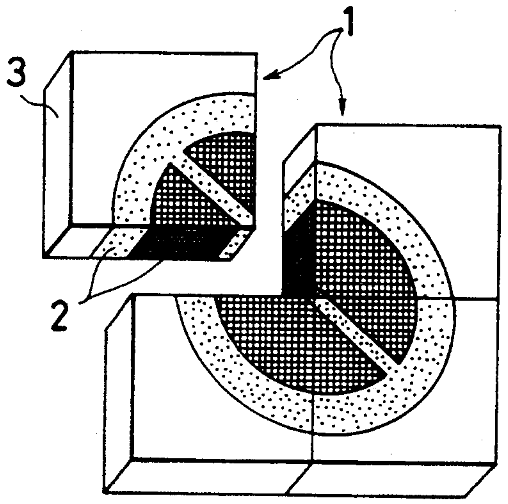
FIG. 1 is a perspective view of a first embodiment of a patterned shaped article (together with three similar articles) produced according to the method of the invention.
Figure 2:
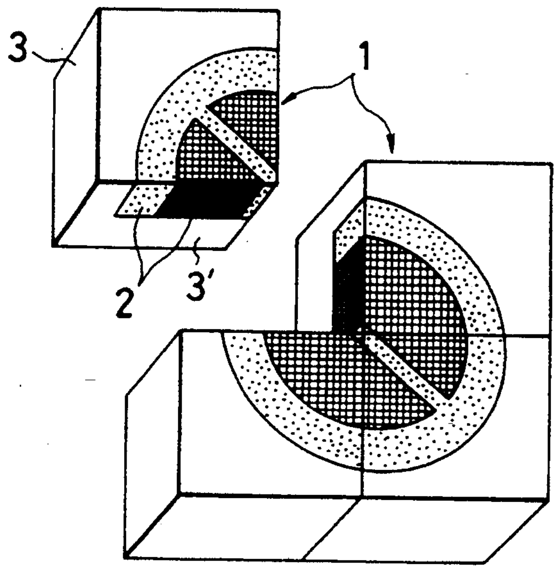
FIG. 2 is a perspective view of a second embodiment of a patterned shaped article (together with three similar articles) produced according to the method of the invention.
Figure 5:
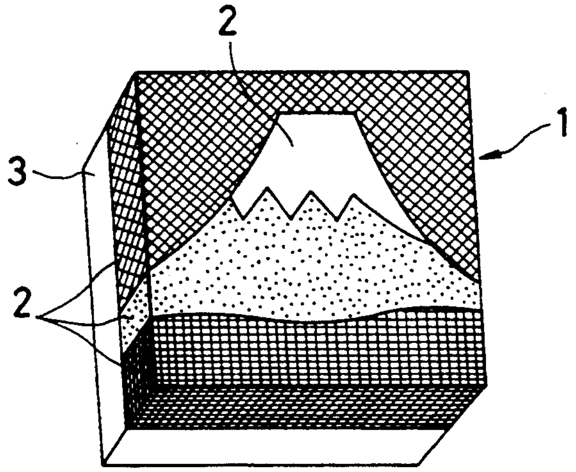
FIG. 5 is a perspective view of a third embodiment of a patterned shaped article produced according to the method of the invention.

FIGS. 1, 2 and 5 respectively show patterned shaped articles produced according to first, second and third embodiments of the present invention. FIGS. 1 and 2 show examples in which four shaped articles are fitted together to create a traffic control mark, and FIG. 5 shows an example in which a single shaped article is formed to have a pattern.

The shaped article of FIG. 1 is formed of a pattern course 2 and a base course 3 which are of equal thickness. The pattern course 2 is exposed at specific portions of the shaped article surfaces. As will be explained in more detail later, this shaped article is produced by charging an auxiliary form 5 disposed within a main form 4 (FIGS. 3 and 4) with a pattern material of prescribed thickness and charging a form cavity located outward of the auxiliary form with a base-course material of the same thickness. In the case of the shaped article of FIG. 2, the pattern course 2 is exposed at a specific portion on the front surface of the shaped article, while the rear surface of the shaped article is formed solely of the base course 3. Specifically, the portion of the base course 3 located underneath the pattern course 2 is relatively thin while the portion thereof that is also exposed on the front surface is thick. As will be explained in more detail later, the shaped article of FIG. 2 is produced by charging an auxiliary form disposed within a main form with pattern material of a prescribed thickness and charging all of the remaining space within the main form (including the form cavity outward of the auxiliary form) with base-course material.

In the shaped article of FIG. 5, the pattern course 2 is exposed over the whole front surface and the rear surface is formed of the base course 3, which is not exposed at the front surface. As will be explained in more detail later, this shaped article is produced by charging both an auxiliary form disposed within a main form and a portion outside the auxiliary form with pattern material of the same prescribed thickness and charging all of the remaining space within the main form with base-course material. (The order of the pattern material and base-course material charging operations can be freely selected in the production of all shaped articles according to this invention.)

Figure 3:
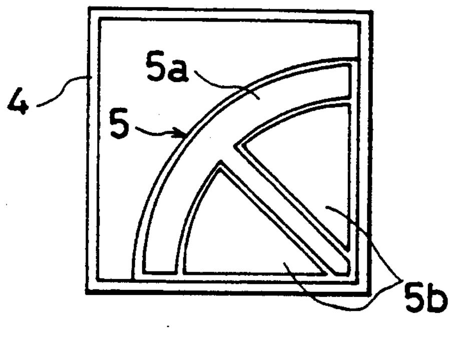
FIG. 3 is a plan view of a main form and an auxiliary form for producing shaped articles of the types shown on FIGS. 1 and 2.
Figure 4:
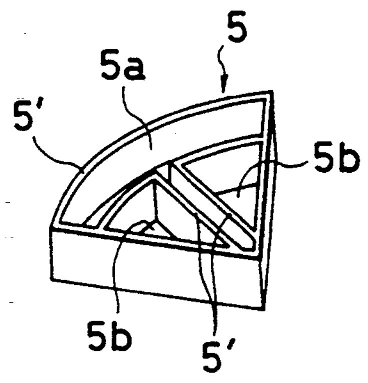
FIG. 4 is a perspective view of the auxiliary form of FIG. 3.
Figure 6:
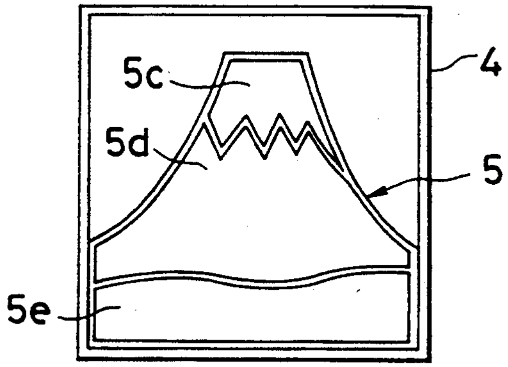
FIG. 6 is a plan view of the main form and auxiliary form used for producing the shaped article of FIG. 5.
Figure 7:
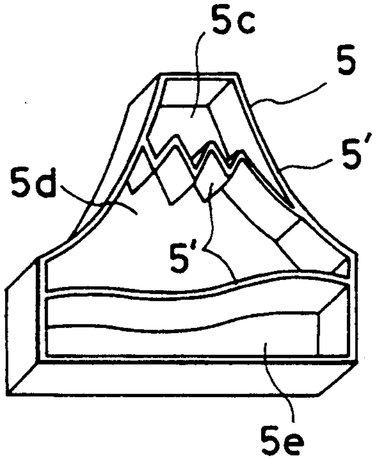
FIG. 7 is a perspective view of the auxiliary form of FIG. 6.

The shaped articles which, as shown in FIGS. 1, 2 and 5, have their pattern courses 2 exposed at all or a part of their front surfaces are produced by disposing an auxiliary form 5 appropriate for the intended pattern within a main form 4 and charging the portions of the so-formed patterning form corresponding to the pattern course 2 with dry pattern material and the portions thereof corresponding to the base course 3 with base-course material. FIG. 4 shows the auxiliary form 5 used in producing the shaped articles of FIGS. 1 and 2, FIG. 3 shows a plan view of this auxiliary form disposed within a main form, FIG. 7 shows the auxiliary form 5 used in producing the shaped article of FIG. 5, and FIG. 6 shows a plan view of this auxiliary form disposed within a main form.

In the case of producing a concrete shaped article, the pattern material charged in the predetermined form cavity portion of the patterning form constituted by the main form 4 and the auxiliary form 5 is cement powder, resin or a mixture thereof and may additionally include at least one of a pigment and fine aggregates. Although the material may have absorbed some moisture after drying, it is not kneaded with water and is in a state readily amenable to pulverization before charging. On the other hand, the concrete base-course material consists mainly of cement powder, resin or a mixture thereof and may additionally include fine aggregates. In the finished state it is required to differ from the pattern material in color, luster, texture and the like, and for this purpose may, if necessary, contain a pigment and either or both of coarse aggregate and fibers selected from among various types of fibers that can be used. The material may be one which has absorbed some moisture after drying but is not kneaded with water and is in a state readily amenable to pulverization before charging. Alternatively, it can be in the form of a concrete slurry obtained by kneading with water. In addition to the aforesaid components, both the pattern material and the base-course material may, as found necessary, further have mixed therewith one or more of crushed or pulverized granite, marble, ceramic, slag, minute light-reflecting particles and the like. They may also contain one or more of a congealing and curing promoter, a waterproofing agent, an inflating agent and the like. The aforesaid various kinds of usable fibers include metal fibers, carbon fibers, synthetic fibers, glass fibers and the like.

The method for producing a concrete shaped article using the aforesaid pattern material and base-course material will now be explained. The auxiliary form 5 can be made of sheet metal, plastic, rubber, wood, paper, non-woven fabric or other such water insoluble material. For enabling its removal from the main form, the auxiliary form 5 is constructed to be open not only at the top but also at the bottom.

Figure 8:
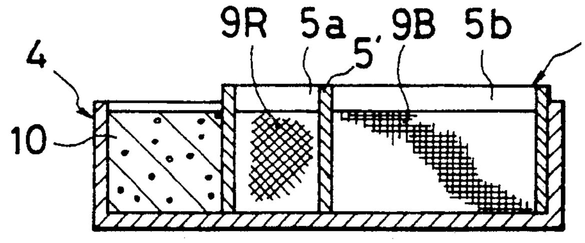
FIG. 8 is a sectional view showing the mode in which the shaped article of FIG. 1 is produced.

For producing the shaped article shown in FIG. 1, a dry red pattern material 9R is charged into the partitioned off T-shaped form cavity 5*a* within the auxiliary form 5 disposed inside the main form 4, a dry blue pattern material 9B is charged into the two sector-shaped form cavities 5*b*, and a dry or wet base-course material 10 is charged into the form cavity outward of the auxiliary form 5. As shown in FIG. 8, all of the materials are charged to the same thickness. They can be charged in any desired order. On completion of material charging, the auxiliary form is removed from the main form. If a dry base-course material was charged, water is then supplied to all portions of the main form interior in such amount as to obtain a prescribed water ratio with respect to the total amount of cement or resin contained in the base-course material 10 and the pattern materials 9R and 9B. This water serves to cause the pattern materials 9R and 9B and the base-course material 10 to set into an integral shaped article. If a wet base-course material was charged, the same effect is obtained by virtue of the water contained therein without supply of additional water. After the materials have set, the main form 4 is removed.

Figure 9:
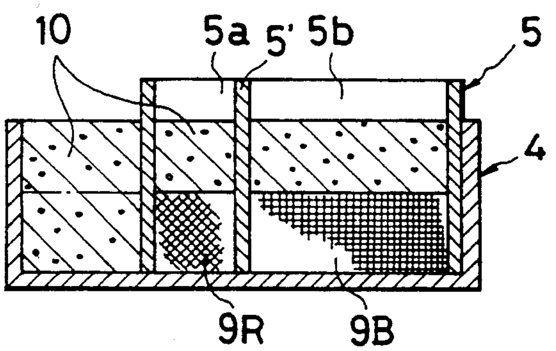
FIG. 9 is a sectional view showing an example of the mode in which the shaped article of FIG. 2 can be produced.
Figure 10:
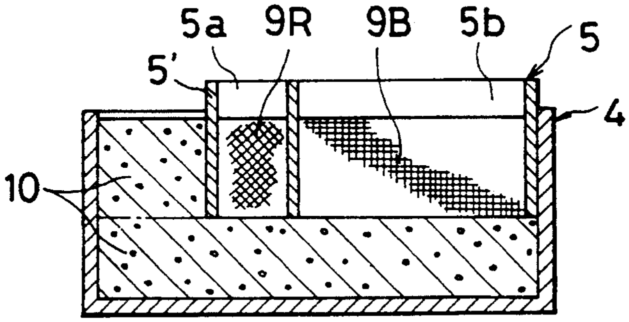
FIG. 10 is a sectional view showing another example of the mode in which the shaped article of FIG. 2 can be produced.

As shown in FIG. 9, for producing the shaped article shown in FIG. 2 dry pattern materials 9R and 9B are charged into form cavities 5*a* and 5*b* of the auxiliary form 5 to a thickness than is less that the overall thickness of the shaped article to be produced, whereafter a dry or wet base-course material 10 is charged to a prescribed thickness both in the form cavity outward of the auxiliary form 5 and on top of the pattern materials 9R and 9B. The auxiliary form 5 is then removed and, if a dry base-course material was used, water is supplied to all of the materials for causing them to set into an integral shaped article, which is then removed from the form. If a wet base-course material was used, the same effect is obtained by virtue of the water contained therein without supply of additional water. Alternatively, as shown in FIG. 10, a thin layer of the base-course material 10 is first charged throughout the patterning form, the pattern materials 9R and 9B are then charged to a prescribed thickness into the form cavities 5*a* and 5*b* of the auxiliary form, and, finally, the base-course material 10 is charged to a prescribed thickness into the form cavity outward of the auxiliary form. Then the auxiliary form is removed and all of the materials are caused to set into an integral shaped article by supplying water thereto in the case of using a dry base-course material or, if a wet base-course material was used, by virtue of the water content thereof.

Figure 11:
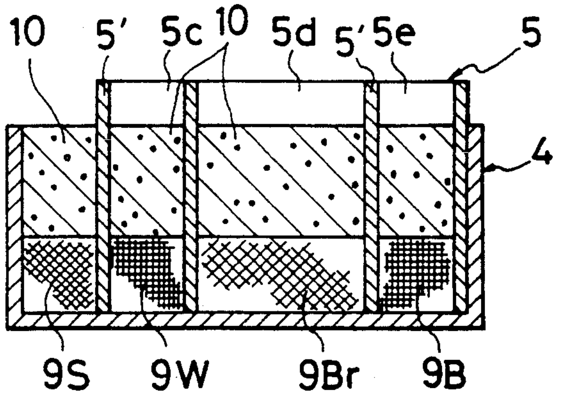
FIG. 11 is a sectional view showing the mode in which the shaped article of FIG. 5 is produced.

As shown in FIG. 11, for producing the shaped article shown in FIG. 5, dry white pattern material 9W for representing the snow covered peak of a mountain is charged into a form cavity 5*c* established in the auxiliary form 5, a dry brown pattern material 9Br for representing the side of the mountain is charged into a form cavity 5*d*, a dry blue pattern material for representing the sea is charged into a form cavity 5*e*, and a dry sky-blue pattern material 9S for representing the sky is charged into the form cavity outward of the auxiliary form 5. These materials are all charged to a thickness less than that of the final product shaped article to be produced. Next, a dry or wet base-course material 10 is charged throughout the interior of the patterning form in such amount as to obtain a final shaped article product of the desired thickness. Alternatively, the wet or dry base-course material 10 can first be charged throughout the interior of the patterning form and the dry pattern materials 9W, 9Br, 9B and 9S thereafter be charged into the cavities 5*c*, 5*d* and 5*e* within the auxiliary form 5 and the form cavity outward of the auxiliary form 5. The auxiliary form is then removed from the main form. If a dry base-course material was used, water is supplied in a prescribed amount throughout the form to cause the materials to set into an integral shaped article. If a wet base-course material was used, the same effect is obtained by virtue of the water contained therein without supply of additional water.

The strength of the shaped article obtained by the foregoing process can be enhanced by disposing a reinforcing material in the patterning form before charging the materials into it. Reinforcing material usable for this purpose include metal fibers and filaments, synthetic fibers and filaments, steel rods, lath screen, expandable metal, and various types of ropes and wires. It is further possible to first charge the base-course material (or the pattern materials), lay one or more of the aforesaid reinforcing materials over the charged material, and then charge the pattern materials (or the base-course material) on top of the previously charged material overlaid with the reinforcing mate, rial. This helps to prevent shifting between upper and lower layers of charged material and also enhances the bonding between the pattern course and the base course.

In any of the aforesaid production methods, once all of the pattern materials have been charged, it is possible to remove the auxiliary form from the main form either before or after the base-course material 10 is charged, insofar as the removal of the auxiliary form is carried out at a stage in which it will not degrade the quality of the pattern being formed. In the case of FIG. 8, for example, since the pattern will disintegrate if the auxiliary form is removed immediately after charging of the pattern materials 9R, 9B, the removal is conducted after the base-course material 10 has been charged into the form cavity outward of the auxiliary form. In the case of FIG. 9, the auxiliary form 5 can be removed after the pattern materials 9R and 9B and the base-course material 10 have all been charged to the same thickness or, alternatively, can be removed after the base-course material has been further charged on top of the initially charged materials. In the case of FIG. 10, the auxiliary form is removed after the pattern materials 9R and 9B and all of the base-course material 10 have been charged, while in the case of FIG. 11, it can be removed either after all of the pattern materials 9S, 9W, 9Br and 9B have been charged or after the base-course material 10 has further been charged on top of these materials. When the auxiliary form is removed, the materials separated by the partitions 5' of the auxiliary form 5 (which may be pattern materials on both sides or a pattern material on one side and the base-course material on the other) cave into and fill up the spaces left by the removal of the auxiliary form. At the time of removing the auxiliary form, it is preferable to vibrate one or both of the auxiliary form and the main form by use of a vibrator or ultrasonic waves as this regulates the cave-in action of the materials and thus promotes the filling in of the spaces formed by extraction of the auxiliary form partitions. For the same purpose, during the setting of the materials after removal of the auxiliary form, it is preferable to subject all of them to pressure by means of a press.

As was explained earlier, in the case where a dry base-course material is used, water is appropriately supplied to all portions of the main form interior in such amount as to obtain a prescribed water ratio with respect to the total amount of cement or resin contained in the base-course material and the pattern materials. In this connection, it is possible to supply the amount of water for specified regions in advance of other regions so as to better regulate movement between the different material regions. On the other hand, where a wet base-course material is used, since the moistening of the pattern materials is realized mainly by virtue of the water content of the base-course material, the water content of the base-course material 10 has to be adjusted in advance in light of the amount of water required both by itself and by the pattern materials. Where the water content of the base-course material 10 is insufficient for appropriately moistening the pattern materials, additional water can of course be added to these materials.

While it suffices for the depth (height) of the auxiliary form 5 to be equal to the thickness of the pattern materials to be charged therein, it is generally more convenient for the auxiliary form 5 to be made high enough to project above the upper surface of the main form 4, as shown in the drawings, since this makes it easier to remove.

In the foregoing embodiments, the auxiliary form 5 was described as being formed of a material that is not soluble in water. Alternatively, however, it is also possible to use an auxiliary form constituted of wafer or other water soluble material. In this case, the auxiliary form 5 dissolves in place within the main form 4 and, therefore, need not necessarily be open at the bottom. The method of producing a concrete shaped article using a water soluble auxiliary form is substantially the same as that in the aforesaid embodiments using an insoluble auxiliary form, the only difference being that there is no need for removing the auxiliary form from the main form since the auxiliary form is dissolved by the supplied water or the water contained in the material so that the materials that were separated by the partitions of the auxiliary form 5 (which may be pattern materials on both sides or a pattern material on one side and the base-course material on the other) cave into and fill up the spaces left by the dissolution of the auxiliary form. For promoting this cave-in action, the materials can be subjected to vibration and/or pressure.

If it is desirable for the auxiliary form to dissolve at an early stage, this can be realized by supplying water to the pattern materials immediately after charging of these materials has been completed, and thereafter charging the base-course material. In this case, if a dry base-course material is used, the amount of water supplied thereto after it is charged is made less than it would otherwise be. If a wet base-course material is used, the water content thereof is similarly reduced. If it is desirable to charge a wet base-course material in advance of the pattern materials, there is used an auxiliary form made of a water soluble material that takes a relatively long time to dissolve because, otherwise, the auxiliary form is liable to dissolve before the charging of the pattern material can be completed.

Since the auxiliary form dissolves within the main form and does not have to be removed, it is preferable to give it a depth (height) equal to the thickness of the pattern materials to be charged therein. Specifically, there is no need for it to project above the upper surface of the main form.

In any of the aforesaid methods of producing a concrete shaped article, the materials can be charged at higher density and as more finely packed by placing the patterning form on a table vibrator and subjecting it to vibration during the charging of both the pattern materials and the base-course material.

Figure 12:
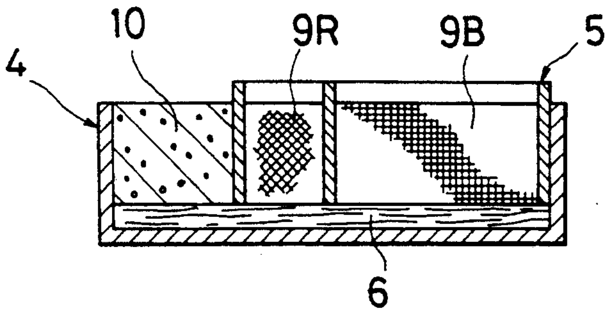
FIG. 12 is a sectional view of an example of the mode in which a shaped article can be produced using a form having a thick mat on the floor thereof.

FIG. 12 shows a case in which a thick, compressible mat 6 of non-woven fabric or the like is laid on the floor of the main form 4 and the auxiliary form 5 is placed on top of the mat 6. An inflating agent is added to one or more of the dry pattern materials 9R and 9B to be charged into the auxiliary form 5 and the base-course material to be charged into the form cavity outward of the auxiliary form 5 (in the illustrated example, the inflating agent was added to the pattern materials 9R and 9B). During setting, the material(s) containing the inflating agent swell and depress the mat 6. As a result, the pattern course or the base course of the final shaped article comes to rise above the general surface level of shaped article, giving the pattern a three-dimensional appearance. While in the illustrated example the main form 4 is open at the top, a more pronounced three-dimensional effect can be realized by covering the top of the main form 4 with a heavy lid so as to ensure that the swelling of the materials will occur mainly in the direction of the mat 6. Moreover, if a mat 6 made of a water absorbing material is used, the mat will absorb any excess water and work to ensure that the water content of the different materials is maintained uniform, thereby improving the strength properties of the shaped article product.

Figure 13:
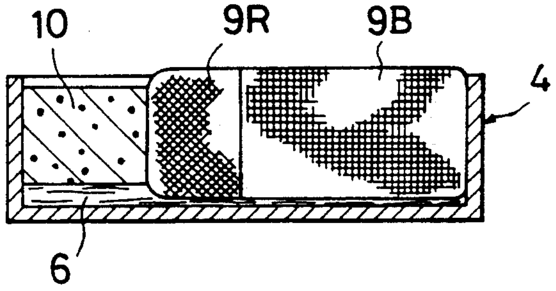
FIG. 13 is a sectional view of another example of the mode in which a shaped article can be produced using a form having a thick mat on the floor thereof.

While the product produced in the manner of FIGS. 12 and 13 is similar to that of the embodiment of FIG. 8, it is also possible to apply similar techniques to obtain products similar to those produced in the manner of FIGS. 9 and 11 but having patterns with a three-dimensional appearance. In the case of FIG. 10, on the other hand, since the pattern materials are charged on top of the previously charged base-course material 10, it is possible to cause the pattern course to rise above the general surface level of the shaped article even without using a thick mat by, for example, mixing an inflating agent into the pattern materials. In this case also, the strength properties of the shaped article product can be improved by laying a water absorbing mat on the floor of the main form before the insertion of the auxiliary form.

The invention can be applied not only to the production of a block-like patterned shaped article as described in the foregoing but also to a method for decorating the surface of an existing concrete surface by bonding a patterned concrete shaped article thereto. This method will now be explained.

Specifically, a patterning form constituted in the manner of, for example, FIG. 3 or 6 by disposing a mat 6 in a bottomless main form 4 is placed on the concrete surface to be decorated. In a manner similar to that in the embodiments described in the foregoing, dry pattern concrete material and base-course material are charged into prescribed form cavities of the patterning form. The patterning form is then removed from the concrete surface and water is supplied to the materials in such amount as to obtain a prescribed water ratio with respect to the total amount of cement or resin contained in the pattern materials and the base-course material. This water serves to cause the materials to set and bond integrally with the concrete surface.

It suffices to remove the patterning form from the concrete surface anytime after water has been supplied to the charged materials but before the materials have set. It is, of course, possible to remove only the auxiliary form 5. If the auxiliary form 5 is formed of wafer or other such water soluble material, it will be gradually dissolved away by the supplied water, making it unnecessary to remove the same.

In the case where an existing vertical concrete wall surface is to be decorated, the pattern concrete materials and the base-course concrete material are first charged into a patterning form that is closed at the bottom. An appropriate amount of water is then supplied to the materials, after partial unmolding if such be necessary, whereafter the materials are pressed against the wall surface, either as charged in the patterning form or after being removed from the patterning form, and maintained in this state by appropriate means until the materials have set and bonded integrally with the wall surface.

The removal of the patterning form from the wall surface can alternatively be carried out after water has been supplied to the materials charged into form cavities but at a stage before the materials have set. It is, of course, possible to remove only the auxiliary form 5. If the auxiliary form 5 is formed of wafer or other such water soluble material, it will be gradually dissolved away by the supplied water, making it unnecessary to remove the same. Aside from the case where the main form 4 is fitted into recesses in the existing wall surface, the bonding of the patterned concrete shaped article to the wall surface has to be conducted by holding the main form 4 in place until the concrete materials have set. This method provides a simple way of decorating cylindrical, wavy and other non-flat surfaces.

Where the shaped article is to be constituted of ceramic material, the dry pattern material may, for example, be constituted of one or more of clay, rock particles, rock granules, glass particles and glass granules, with or without a pigment or colorant added thereto. The word "article" used herein is defined as having a diameter of not more than a few millimeters and "granule" as having a diameter in the range of a few millimeters to about 10 millimeters. The material may be one which has absorbed some water or been added with a lubricant/bonding agent after drying but it is not kneaded with water or the lubricant/bonding agent and is in a state readily amenable to pulverization. The base-course material may, for example, be constituted of one or more of clay, rock particles, rock granules, glass particles and glass granules, with or without a pigment or colorant added thereto. In the finished state it is required to differ from the pattern material in color, luster, texture and the like. The material may be one which has absorbed some moisture or been added with a lubricant/bonding agent after drying but is not kneaded with water or the lubricant/bonding agent and is in a state readily amenable to pulverization before charging. Alternatively, it can be a wet material obtained by kneading with water or lubricant. In addition to the aforesaid components, both the pattern material and the base-course material may, as found necessary, further have mixed therewith granular or powdered ceramic material granular or powdered new ceramic material, granular or powdered metal or other minerals, and may also contain one or more lubricants, bonding agents and other additives.

The auxiliary form 5 used in conjunction with the aforesaid pattern and base-course materials can be made of metal plastic, rubber, wood, paper, non-woven fabric or other material not soluble in water or lubricant/loading agent and is open not only at the top but also at the bottom so as to enable its removal from the main form.

For producing the raw product for the shaped article shown in FIG. 1 a dry pattern material 9R which becomes red upon sintering is charged into the partitioned off T-shaped form cavity 5*a* within the auxiliary form 5 disposed inside the main form 4, a dry pattern material 9B which becomes blue upon sintering is charged into the two sector-shaped form cavities 5*b*, and a dry or wet base-course material 10 is charged into the form cavity outward of the auxiliary form 5. As shown in FIG. 8, all of the materials are charged to the same thickness. They can be charged in any desired order. On completion of material charging, the auxiliary form is removed from the main form.

In the present embodiment, a ceramic shaped article with a translucent pattern course can be obtained by using pattern materials which become translucent upon sintering.

As shown in FIG. 9, for producing the raw product for the shaped article shown in FIG. 2, dry pattern materials 9R and 9B are charged into form cavities 5*a* and 5*b* of the auxiliary form 5 to a thickness that is less than the overall thickness of the raw product for the shaped article, whereafter a base-course material 10 is charged to a prescribed thickness both in the form cavity outward of the auxiliary form 5 and on top of the pattern materials 9R and 9B. The auxiliary form 5 is then removed. Alternatively, as shown in FIG. 10, a thin layer of the base-course material 10 is first charged throughout the patterning form, the pattern materials 9R and 9B are then charged to a prescribed thickness into the form cavities 5*a* and 5*b* of the auxiliary form, and, finally, the base-course material 10 is charged to a prescribed thickness into the form cavity outward of the auxiliary form. Then the auxiliary form is removed.

As shown in FIG. 11, for producing the raw product for the shaped article shown in FIG. 5, dry pattern material 9W which becomes white upon sintering and is thus appropriate for representing the snow covered peak of a mountain is charged into a form cavity 5*c* established in the auxiliary form 5, a dry pattern material 9Br which becomes brown upon sintering and is thus suitable for representing the side of the mountain is charged into a form cavity 5*d*, a dry pattern material 9B which becomes blue upon sintering and is thus suitable for representing the sea is charged into a form cavity 5*e*, and a dry pattern material 9S which becomes sky-blue upon sintering and is thus suitable for representing the sky is charged into the form cavity outward of the auxiliary form 5. These materials are all charged to a thickness less than that of the raw product for the shaped article. Next, a dry or wet base-course material 10 is charged throughout the interior of the patterning form in such amount as to obtain a raw product of the desired thickness. Alternatively, the base-course material 10 can first be charged throughout the interior of the patterning form and the dry pattern materials 9W, 9Br, 9B and 9S can be thereafter charged into the cavities 5*c*, 5*d* and 5*e* within the auxiliary form 5 and the form cavity outward of the auxiliary form 5. The auxiliary form is then removed from the main form.

In any of the aforesaid production methods, once all of the pattern materials have been charged, it is possible to remove the auxiliary form from the main form either before or after the base-course material 10 is charged, insofar as the removal of the auxiliary form is carried out at a stage in which it will not degrade the quality of the pattern being formed. In the case of FIG. 8, for example, since the pattern will disintegrate if the auxiliary form is removed immediately after charging of the pattern materials 9R, 9B, the removal is conducted after the base-course material 10 has been charged into the form cavity outward of the auxiliary form. In the case of FIG. 9, the auxiliary form 5 can be removed after the pattern materials 9R and 9B and the base-course material 10 have all been charged to the same thickness or, alternatively, can be removed after the base-course material has been further charged on top of the initially charged materials. In the case of FIG. 10, the auxiliary form is removed after the pattern materials 9R and 9B and all of the base-course material 10 have been charged, while in the case of FIG. 11, it can be removed either after all of the pattern materials 9S, 9W, 9Br and 9B have been charged or after the base-course material 10 has further been charged on top of these materials. When the auxiliary form is removed, the materials separated by the partitions 5' of the auxiliary form 5 (which may be pattern materials on both sides or a pattern material on one side and the base-course material on the other) cave into and fill up the spaces left by the removal of the auxiliary form. At the time of removing the auxiliary form, it is preferable to vibrate one or both of the auxiliary form and the main form by use of a vibrator or ultrasonic waves as this regulates the cave-in action of the materials and thus promotes the filling in of the spaces formed by extraction of the auxiliary form partitions. For the same purpose, during the setting of the materials after removal of the auxiliary form, it is preferable to subject all of them to pressure by means of a press.

In the case where a dry base-course material is used, water or lubricant/bonding agent is appropriately supplied to all portions of the main form interior in such amount as to obtain a water content or lubricant/bonding agent content as required for press forming of the raw product. For controlling movement among the different materials or other such purposes, the water or lubricant/bonding agent can be supplied to specified regions in advance of other regions.

In the case where a wet base-course material is used, if the water or lubricant/bonding agent content thereof is higher than necessary, the excess water or lubricant-/bonding agent is supplied to the dry pattern material. Where the-water or lubricant/bonding agent content of the base-course material 10 and the pattern material is insufficient, additional water or lubricant/bonding agent can of course be added to these materials.

When the auxiliary form 5 has been removed and the pattern material and the base-course material have the water or lubricant/bonding agent content required for pressure forming, the two kinds of materials in the main form are pressed to obtain a raw product for the ceramic shaped article. The raw product is then removed from the main form and heated to the temperature required for sintering it into an integral ceramic shaped article. Before sintering, the water content or lubricant-/bonding agent content of the raw product can be adjusted and/or glaze can be applied thereto.

Where an auxiliary form 5 made from wafer or other material soluble or in water lubricant/bonding agent is used, it will be dissolved away. Thus since it does not have to be removed, it need not be open at both the top and bottom but may be closed at the bottom.

The method of producing a ceramic shaped article of the type shown in FIG. 1, 2 or 5 using an auxiliary form made of wafer or other water or solvent soluble material is substantially the same as that in the aforesaid embodiments using an insoluble auxiliary form, the only difference being that there is no need for removing the auxiliary form from the main form since the auxiliary form is dissolved by the water or lubricant/bonding agent contained in the materials so that the materials that were separated by the partitions of the auxiliary form 5 (which may be pattern materials on both sides or a pattern material on one side and the base-course material on the other) cave into and fill up the spaces left by the dissolution of the auxiliary form. For promoting this cave-in action, the materials can be subjected to vibration and/or pressure.

If it is desirable for the auxiliary form to dissolve at an early stage, this can be realized by supplying water or lubricant/bonding agent to the pattern materials immediately after charging of these materials has been completed, and thereafter charging the base-course material. In this case, if a dry base-course material is used, the amount of water or lubricant/bonding agent supplied thereto after it is charged is made less than it would otherwise be. If a wet base-course material is used, the water or lubricant/bonding agent content thereof is similarly reduced. If it is desirable to charge a wet base-course material in advance of the pattern materials, there is used an auxiliary form made of a water or lubricant/bonding agent soluble material that takes a relatively long time to dissolve because, otherwise, the auxiliary form is liable to dissolve before the charging of the pattern material can be completed.

Since the auxiliary form dissolves within the main form and does not have to be removed, it is preferable to give it a depth (height) equal to the thickness of the pattern materials to be charged therein. Specifically, there is no need for it to project above the upper surface of the main form.

In any of the aforesaid methods of producing a ceramic shaped article, the materials can be charged at higher density and as more finely packed by placing the patterning form on a table vibrator and subjecting it to vibration during the charging of both the pattern materials and the base-course material. FIG. 12 shows a case in which a thick, compressible mat 6 of non-woven fabric or the like is laid on the floor of the main form 4 and the auxiliary form 5 is placed on top of the mat 6. With this arrangement, the mat will absorb any excess water and lubricant/bonding agent and work to ensure that the water and lubricant/bonding agent contents of the different materials are maintained uniform, thereby promoting degassing of the materials during pressing so as to enhance the forming and molding properties of the raw product.

While the raw product produced in the manner of FIGS. 12 and 13 is similar to that of the embodiment of FIG. 8, it is also possible to apply similar techniques to obtain raw products similar to those produced in the manner of FIGS. 9 and 11. On the other hand, in the case of FIG. 10 in which the pattern materials are charged on top of the previously charged base-course material 10, a water or oil absorbing mat can be laid on the top surface of the raw product or on the floor of the main form. This will ensure that the water and lubricant/bonding agent contents of the different materials are maintained uniform and thus promote degassing of the materials during pressing, which in turn enhances the forming and molding properties of the raw product.

Where the shaped article is to be constituted of artificial stone, the aggregate used as the dry pattern material may, for example, be constituted of one or more of gravel, pieces of rock, ceramic, new ceramic, glass, plastic, wood, metal and other such pieces, with or without a pigment. The material may be one which has absorbed some water or been added with a solvent but it is not kneaded with water or the solvent and is in a state readily amenable to pulverization and supply to the form cavities.

The aggregate used as the base-course material may, for example, be constituted of one or more of gravel, pieces of rock, ceramic, new ceramic, glass, and plastic, with or without a pigment added thereto. In the finished state it is required to differ from the pattern material in color, luster, texture and the like.

As the material for causing the pattern material and the base-course material charged into the patterning form to set there can be used a blended combination of cement powder and water, of cement powder, resin and water, or of resin and water or solvent. Moreover, any of these combinations may further include as blended therewith a powder of one or more of rock, ceramic, new ceramic, glass and plastic. If required, the material may further have blended therewith any of various powders, granules or fibers and/or any of various additives, pigments and colorants.

The aforesaid powders and granules include powders and granules of slag, fly ash, fine light-reflecting particles or other such substances. Usable fibers include metal fibers, carbon fibers, synthetic fibers, glass fibers and the like. Usable additives include shrink proofing agents, congealing and setting agents, delaying agents, water proofing agents, inflating agents, water reducing agents, fluidizing agents and the like.

If necessary for enhancing the adherence of the setting material with the pattern aggregate and the base-course aggregate, these materials can be sprayed with or immersed in water, solvent or surface treatment agent.

For using the pattern aggregate and the base-course aggregate to produce an artificial stone block, a red pattern aggregate 9R is charged into the partitioned off T-shaped form cavity 5*a* within the auxiliary form 5 made of the same material as in the previous embodiment, such as metal, plastic, rubber, wood, paper, nonwoven fabric, etc. and disposed inside the main form 4, a blue pattern aggregate 9B is charged into the two sector-shaped form cavities 5*b*, and a base-course aggregate 10 is charged into the form cavity outward of the auxiliary form 5. As shown in FIG. 8, all of the materials are charged to the same thickness. They can be charged in any desired order. On completion of material charging, the auxiliary form is removed from the main form and a setting material is charged into the voids within the respective aggregates for causing them to set into an integral shaped article. After the materials have set, the integral shaped article is removed from the main form 4.

As shown in FIG. 9, for producing the block shown in FIG. 2, pattern aggregates 9R and 9B are charged into form cavities 5*a* and 5*b* of the auxiliary form 5 to a thickness that is less than the overall thickness of the product block, whereafter a base-course aggregate 10 is charged to a prescribed thickness both in the form cavity outward of the auxiliary form 5 and on top of the pattern aggregates 9R and 9B. The auxiliary form 5 is then removed and a setting material is charged into the voids within the respective aggregates for causing them to set into an integral shaped article. Alternatively, as shown in FIG. 10, a thin layer of the base-course aggregate 10 is first charged throughout the patterning form, the pattern aggregates 9R and 9B are then charged to a prescribed thickness into the form cavities 5*a* and 5*b* of the auxiliary form, and, finally, the base-course aggregate 10 is charged to a prescribed thickness into the form cavity outward of the auxiliary form. Then the auxiliary form is removed and a setting material is charged into the voids within the respective aggregates for causing them to set into an integral shaped article.

As shown in FIG. 11, for producing the block shown in FIG. 5, white pattern aggregate 9W for representing the snow covered peak of a mountain is charged into a form cavity 5*c* established in the auxiliary form 5, a brown pattern aggregate 9Br for representing the side of the mountain is charged into a form cavity 5*d*, a blue pattern aggregate 9B for representing the sea is charged into a form cavity 5*e*, and a sky-blue pattern aggregate 9S for representing the sky is charged into the form cavity outward of the auxiliary form 5. These aggregates are all charged to a thickness less than that of the final product shaped article to be produced. Next, a base-course aggregate 10 is charged throughout the interior of the patterning form in such amount as to obtain a final shaped article product of the desired thickness. Alternatively, the base-course aggregate 10 can first be charged throughout the interior of the patterning form and the pattern aggregates 9W, 9Br, 9B and 9S thereafter be charged into the cavities 5*c*, 5*d* and 5*e* within the auxiliary form 5 and the form cavity outward of the auxiliary form 5. The auxiliary form is then removed from the main form and a setting material is charged into the voids within the respective aggregates for causing them to set into an integral shaped article.

In any of the aforesaid production methods, once all of the pattern aggregates have been charged, it is possible to remove the auxiliary form from the main form either before or after the base-course aggregate 10 is charged, insofar as the removal of the auxiliary form is carried out at a stage in which it will not degrade the quality of the pattern being formed. In the case of FIG. 8, for example, since the pattern will disintegrate if the auxiliary form is removed immediately after charging of the pattern aggregates 9R, 9B, the removal is conducted after the base-course aggregate 10 has been charged into the form cavity outward of the auxiliary form. In the case of FIG. 9, the auxiliary form 5 can be removed after the pattern aggregates 9R and 9B and the base-course aggregate 10 have all been charged to the same thickness or, alternatively, can be removed after the base-course aggregate has been further charged on top of the initially charged aggregates. In the case of FIG. 10, the auxiliary form is removed after the pattern aggregates 9R and 9B and all of the base-course aggregate 10 have been charged, while in the case of FIG. 11, it can be removed either after all of the pattern aggregates 9S, 9W, 9Br and 9B have been charged or after the base-course aggregate 10 has further been charged on top of these aggregates. When the auxiliary form is removed, the aggregates separated by the partitions 5' of the auxiliary form 5 (which may be pattern aggregates on both sides or a pattern aggregate on one side and the base-course aggregate on the other) cave into and fill up the spaces left by the removal of the auxiliary form. At the time of removing the auxiliary form, it is preferable to vibrate one or both of the auxiliary form and the main form by use of a vibrator or ultrasonic waves as this regulates the cave-in action of the aggregates and thus promotes the filling in of the spaces formed by extraction of the auxiliary form partitions. For the same purpose, during the setting of the aggregates after removal of the auxiliary form, it is preferable to subject all of them to pressure by means of a press.

The charging of the setting material throughout the voids of the aggregates can be carried out by vacuum charging. Further, it is possible to supply the amount of setting material for specified regions in advance of other regions so as to better regulate movement between the different material regions. Also, depending on the fluidity of the setting material, it is possible to use a base-course aggregate that has been charged with the setting material in advance. While it suffices for the depth (height) of the auxiliary form 5 to be equal to the thickness of the pattern aggregates to be charged therein, it is generally more convenient for the auxiliary form 5 to be made high enough to project above the upper surface of the main form 4, as shown in the drawings, since this makes it easier to remove.

In the method of producing a shaped artificial stone article set out above, the auxiliary form was described as being formed of an insoluble material. Alternatively, however, it is also possible to use an auxiliary form constituted of wafer or other water or solvent soluble material. In this case, the auxiliary form is dissolved by the setting material and, therefore, may be closed at the bottom.

Since the auxiliary form dissolves after the pattern and base-course aggregates have been charged into it, it does not have to be removed. Aside from this difference, the method of producing a shaped article using an insoluble auxiliary form is substantially the same as that in the aforesaid embodiment using an insoluble auxiliary form. When the auxiliary form dissolves, the aggregates that were separated by the partitions of the auxiliary form (which may be pattern aggregates on both sides or a pattern aggregate on one side and the base-course aggregate on the other) cave into and fill up the spaces left by the dissolution of the auxiliary form. For promoting this cave-in action, the materials can be subjected to vibration and/or pressure.

If it is desirable for the auxiliary form to dissolve at an early stage, this can be realized by supplying setting material to the pattern aggregates immediately after charging of these aggregates has been completed, and thereafter charging the base-course aggregate. In this case, the amount of setting material subsequently charged is reduced. If it is desirable to charge base-course aggregate precharged with setting material in advance of the pattern aggregates, there is used an auxiliary form made of a soluble material that takes a relatively long time to dissolve because, otherwise, the auxiliary form is liable to dissolve before the charging of the pattern aggregates can be completed.

Since the auxiliary form dissolves within the main form and does not have to be removed, it is preferable to give it a depth (height) equal to the thickness of the pattern materials to be charged therein. Specifically, there is no need for it to project above the upper surface of the main form.

In the aforesaid method of producing an artificial stone shaped article, the aggregates can be charged at higher density and as more finely packed by placing the patterning form on a table vibrator and subjecting it to vibration during the charging of both the pattern aggregates and the base-course aggregate. FIG. 12 shows a case in which a thick, compressible mat 6 of non-woven fabric or the like is laid on the floor of the main form 4 and the auxiliary form 5 is placed on top of the mat 6. An inflating agent is added to one or more of the dry pattern aggregates 9R and 9B to be charged into the auxiliary form 5 and the base-course aggregate to be charged into the form cavity outward of the auxiliary form 5 (in the illustrated example, the inflating agent was added to the pattern aggregates 9R and 9B). During setting, the aggregate(s) containing the inflating agent swell and depress the mat 6. As a result, the pattern course or the base course of the final shaped article comes to rise above the general surface level of shaped article, giving the pattern a three-dimensional appearance. While in the illustrated example the main form 4 is open at the top, a more pronounced three-dimensional effect can be realized by covering the top of the main form 4 with a heavy lid so as to ensure that the swelling of the materials will occur mainly in the direction of the mat 6. Moreover, if a mat 6 made of a water or oil absorbing material is used, the mat will absorb any excess water or solvent and work to ensure that the water content of the different materials is maintained uniform, thereby improving the strength properties of the shaped article product.

While the artificial stone shaped article produced in the manner of FIGS. 12 and 13 is similar to that of the embodiment of FIG. 8, it is also possible to apply similar techniques to obtain shaped articles similar to those produced in the manner of FIGS. 9 and 11. In the case of FIG. 10, on the other hand, since the pattern aggregates 9R and 9B are charged on top of the previously charged base-course aggregate 10, it is possible to cause the pattern course to rise above the general surface level of the shaped article even without using a thick mat by, for example, mixing an inflating agent into the setting material to be charged into the voids in the pattern aggregates. In this case also, the strength properties of the shaped article product can be improved by laying a water or oil absorbing mat on the floor of the main form before the insertion of the auxiliary form.

Figure 14:
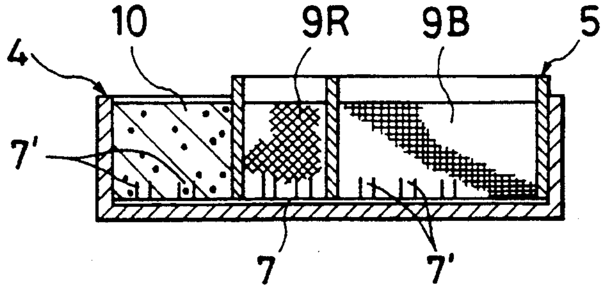
FIG. 14 is a sectional view showing an example of the mode in which a shaped article can be produced using a form having a sheet formed with upright pins on the floor thereof.
Figure 15:
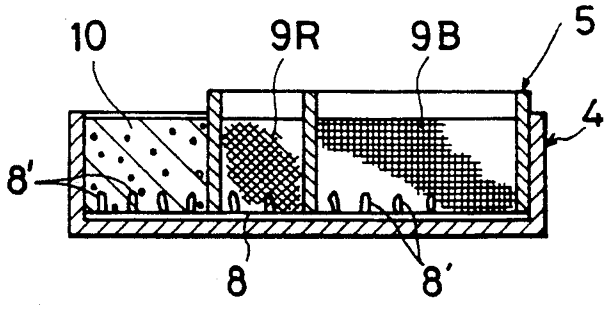
FIG. 15 is a sectional view showing an example of the mode in which a shaped article can be produced using a form having a sheet formed with hairs on the floor thereof.

In any of the above individually explained methods for producing a concrete shaped article, a ceramic shaped article or an artificial stone shaped article, it is, as illustrated in FIGS. 14 and 15, advantageous to lay on the floor of the main form 4 a plate or sheet having pins or projections 7' or a sheet 8 having implanted, raised or attached hairs, pile or loops 8' and to place the auxiliary form 5 on top of this plate or sheet. Then when the pattern materials 9R, 9B and the base-course material 10 are charged into the respective form cavities, they will be held in place by the pins or projections 7' or the hairs, pile or loops 8'. As a result, they will be prevented from shifting under the effect of vibration or the like until they have completely set, thus ensuring sharp boundaries between the different pattern materials and between the pattern materials 9R and 9B and the base-course material 10.

The need for removing the sheet or plate having the pins, projections, hairs, pile or loops can be eliminated by forming the entire sheet or plate including the members projecting therefrom of a soluble material that will dissolve by the time that the different materials have set. Whether to use a soluble or an insoluble sheet or plate is decided in light of the degree to which the materials have to be retained.

A method for using a patterning form constituted of a deformable material for producing patterned shaped articles of other than block-like configuration will now be explained with reference to FIGS. 16–25.

Figure 16:
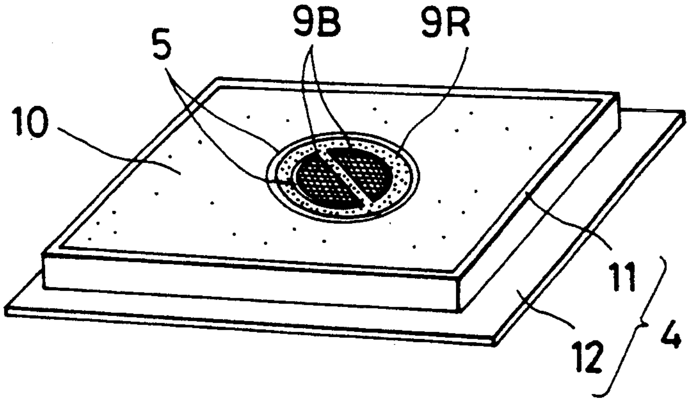
FIG. 16 is a perspective view of a form for producing a cylindrical shaped article according to the invention, shown in the state charged with the pattern material and the base-course material.
Figure 17:
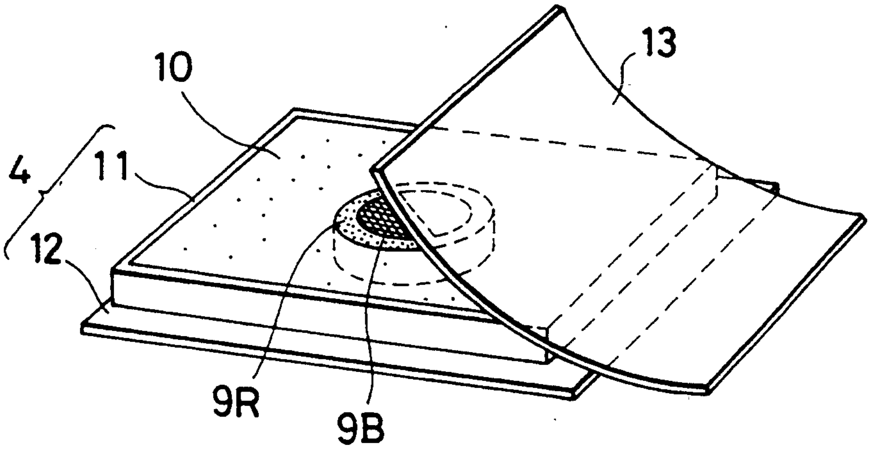
FIG. 17 is a perspective view showing the material charged into the main form of FIG. 16 after it has set.
Figure 18:
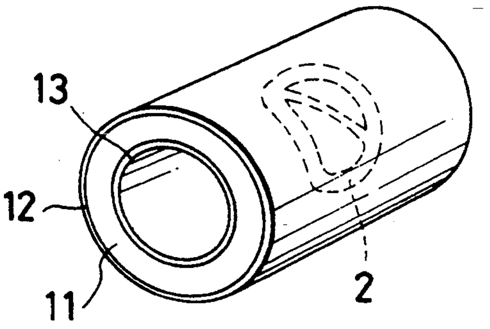
FIG. 18 is a perspective view of a cylindrical shaped article formed by rolling up congealed materials together with the form.

FIGS. 16–18 illustrate an embodiment for producing a cylindrical shaped article. The main form 4 is constituted of a deformable peripheral frame 11 made of natural rubber, synthetic rubber, plastic or the like and a coilable bottom sheet 12 made of sheet metal, plastic, paper, non-woven fabric, knit fabric or woven fabric, rubber sheet or the like. The peripheral frame 11 is set on the bottom sheet 12 and a auxiliary form 5 is disposed at a prescribed position within the area surrounded by the peripheral frame 11. Dry pattern materials 9R and 9B are charged into the auxiliary form and a base-course material 10 is charged into the form cavity outward of the auxiliary form 5 (FIG. 16). After the two types of material have been brought to a deformable state owing to their congelation etc., the area within the peripheral frame 11 is covered with a coilable auxiliary sheet 13 similar to the bottom sheet 12 (FIG. 17). The two types of material within the area surrounded by the peripheral frame 11 are coiled (rolled up) together with the peripheral frame 11, as sandwiched between the bottom sheet 12 and the auxiliary sheet 13 (FIG. 18). The two types of material are maintained in the rolled-up state until they set, whereby there is obtained a cylindrical shaped article having a pattern course 2 exposed at a desired position thereof. (Where ceramic materials are used, there is obtained a raw product which is thereafter sintered into the final patterned shaped article.)

Figure 19:
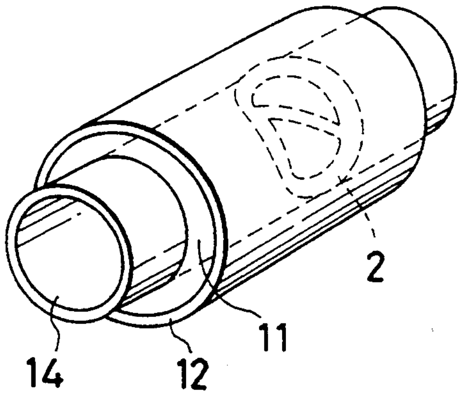
FIG. 19 is a perspective view of a cylindrical shaped article produced according to another embodiment of the invention.

In the example shown in FIG. 19, the pattern materials and the base-course material are charged in the same way as in the case of FIG. 16. After they have been brought to a deformable state owing to their congelation etc., they are wrapped around a die 14 matched to the internal shape of the cylindrical shaped article to be produced (cylindrical in the case of a cylindrical shaped article product) and are held wrapped therearound until they have set into a cylindrical shaped article. In this case, since the surfaces of the pattern materials 9R and 9B and the base-course material 10 exposed on the upper side within the peripheral frame 11 are held in contact with the outer surface of the die 14, the auxiliary sheet 13 can be omitted. Use of a polygonal die 14 makes it possible to produce a cylindrical shaped article having a polygonal sectional configuration.

In the wrapping or coiling method illustrated in FIGS. 18 and 19, when the opposite ends of the peripheral frame 11 come into contact, a form cavity occurs at the seam between the opposite edges of the base-course material. One way of coping with this problem is to slightly overlap the opposite edges of the peripheral frame 11 so as to form a double layer of the base-course material at the seam. Another is to cut away the opposite edges of the peripheral frame 11 so that the thus opposite exposed edges of the base-course material can be brought into abutment for preventing the formation of a space at the seam.

Figure 20:
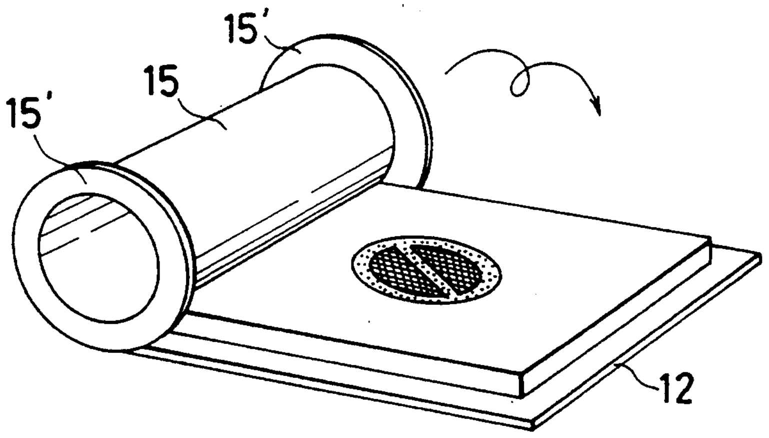
FIG. 20 is a perspective view of a cylindrical shaped article produced according to another embodiment of the invention.
Figure 21:
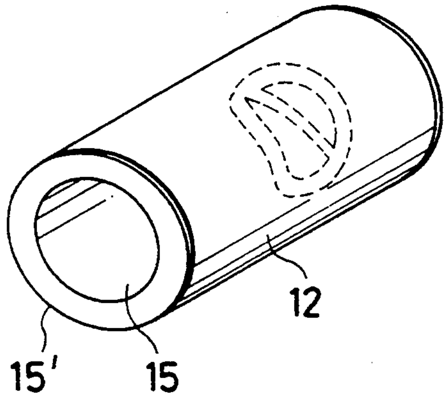
FIG. 21 is a perspective view of a cylindrical shaped article produced according to the method of FIG. 20.

In a similar manner, it is further possible to produce a cylindrical shaped article by charging the pattern materials 9R and 9B and the base-course material 10 into the patterning form 4 in the manner of FIG. 16, removing the peripheral frame 11 as shown in FIG. 20 after the charged materials have been brought to a deformable state owing to their congelation etc., wrapping them together with the bottom sheet 12 onto a die 15 matched to the internal shape of the cylindrical shaped article to be produced and having a flange 15' at either end, and maintaining the two types of material in the rolled-up condition until they set (FIG. 21). As in the case of FIG. 19, the inside length of the peripheral frame 11 is of course made the same as the outer circumference of the die 15 and the width thereof is made equal to the distance between the flanges 15'. It is again possible to omit use of the auxiliary sheet 13 and possible to produce a cylindrical shaped article having a polygonal sectional configuration by using a polygonal die 15.

While the foregoing description relates to the production of a cylindrical shaped article, it is also possible by partially or totally deforming the patterning form to produce shaped articles of other than cylindrical configuration.

Figure 22:
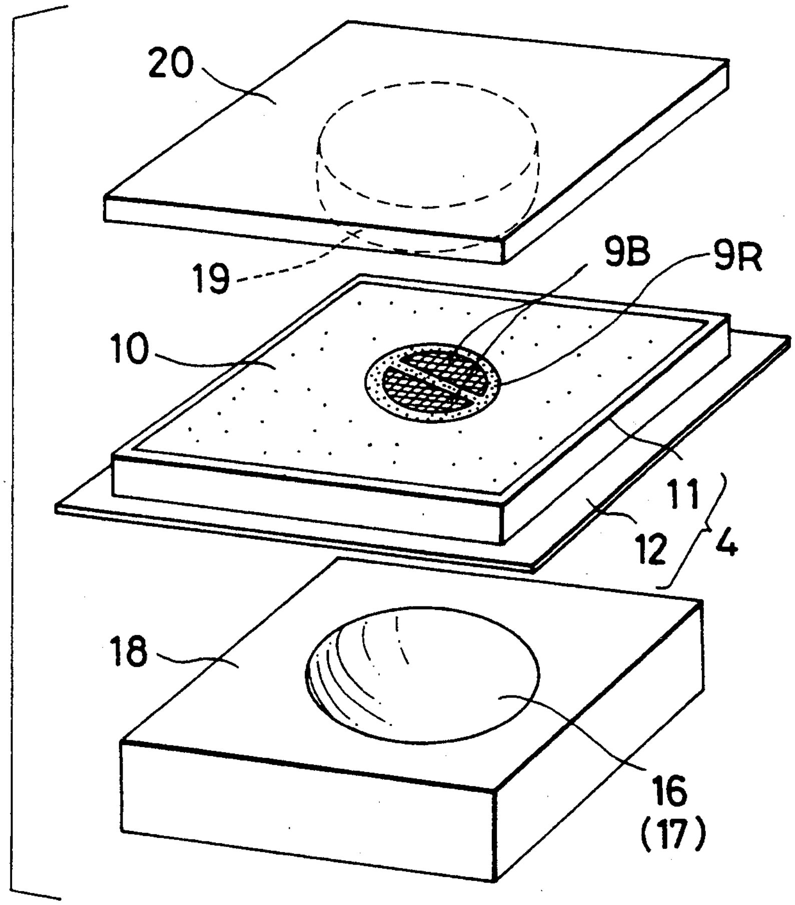
FIG. 22 is an exploded perspective view of a method according to the invention for producing a shaped article with a downwardly bulged profile.
Figure 23:
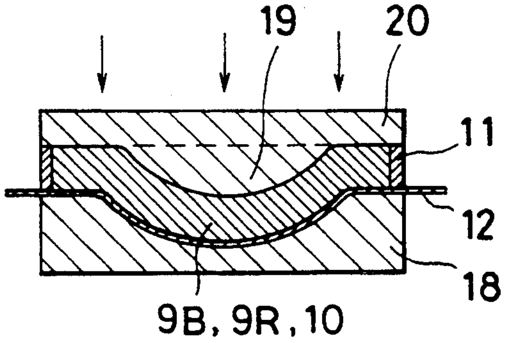
FIG. 23 is a sectional view showing the mode in which the shaped article of FIG. 22 is produced.

For example, a shaped article with a downwardly bulged configuration can be produced by charging the pattern materials 9R and 9B and the base-course material 10 into the patterning form in the manner of FIG. 16, placing the result on a lower die 18 whose upper surface is formed with a recess 16 filled with gel 17, as shown in FIG. 22, pressing it from above with an upper die 20 having a protuberance 19 complementary to the recess 16 (FIG. 23), thus causing its upper surface to be depressed by the protuberance 19 and its lower surface to be pushed into the recess 16. In this case, since the only part of the patterning form to be deformed is a part of the bottom sheet 12, the peripheral frame 11 need not be deformable. The purpose of the gel 17 in the recess 16 is to hold the portion of the bottom sheet 12 positioned over the recess 16 flat up to the time that pressure is applied by the upper die 20. With the start of pressure application by the upper die 20, the gel is caused to overflow from around the upper edge of the recess 16 as a result of the intrusion into the recess 16 of the bottom sheet and the material resting thereon. Alternatively, the lower die 18 can be formed of clay or other plastic material. In this case, since the plastic lower die will be depressed by the pressure of the upper die so as to form the recess 16, there is no need to use the gel 17.

Figure 24:
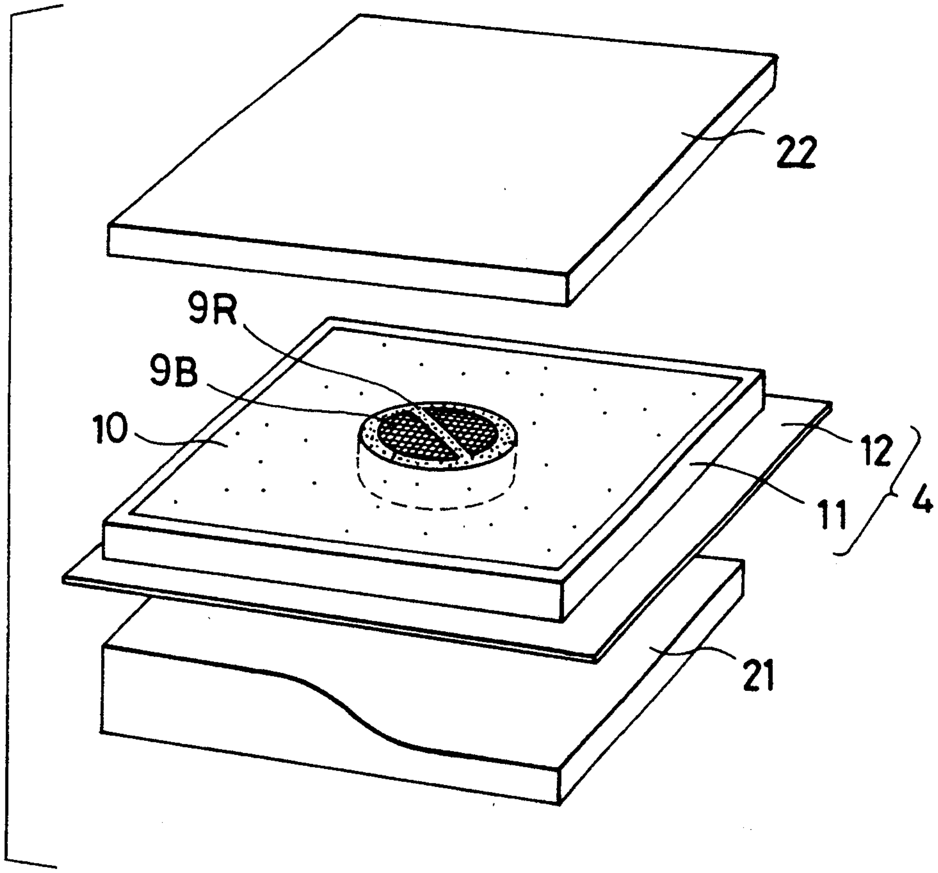
FIG. 24 is an exploded perspective view of a method according to the invention for producing a roof tile-like shaped article.
Figure 25:
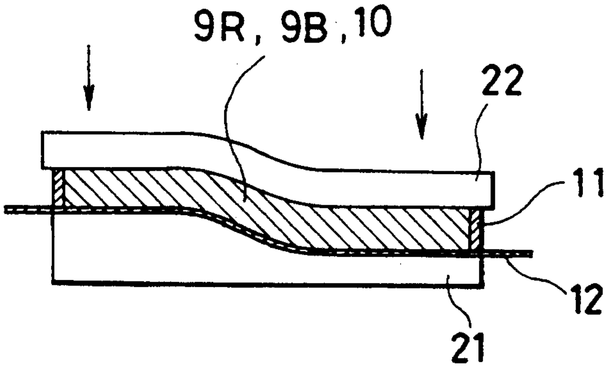
FIG. 25 is a sectional view showing the mode in which the shaped article of FIG. 24 is produced.

Further, a roof tile-like shaped article can be produced by charging the pattern materials 9R and 9B and the base-course material 10 into the patterning form in the manner of FIG. 16, placing the result on a lower die 21 having a rising-and-falling upper surface, as shown in FIG. 24, pressing it from above with a flat elastic plate 22 (FIG. 25), thus causing the patterning form and both types of materials contained therein to be deformed in accordance with the contour of the lower die 21. In this case, while it is possible to constitute the main form 4 of the aforesaid peripheral frame 11 and a bottom sheet 12 laid on the bottom thereof, it is also possible to use a main form 4 that is made closed at the bottom by providing the peripheral frame 11 with a deformable floor.

In production involving deformation of part or all of the main form in the aforesaid manner, if the auxiliary form is deformable, it can, even if insoluble, be removed after deformation of the main form. If, however, the auxiliary form is both insoluble and incapable of deformation, it has to be removed prior to deformation the main form. On the other hand, if the auxiliary form is water soluble, it suffices to deform the main form after dissolution of the auxiliary form has begun.

In the description of the embodiments according to FIGS. 8, 9 and 10, it was stated that dry pattern materials 9R and 9B are charged into the auxiliary form. The invention is not limited to this, however, and it is alternatively possible to carry out production of a shaped article by charging dry pattern material into only some of the form cavities within the auxiliary form and charging dry or wet base-course material into the remaining portions of the patterning form.

Moreover, the charging of the pattern and base-course materials need not be conducted manually but can be conducted by a robot, thus making it possible to charge the materials even in a fine dot-like pattern.

Further, it is possible to use a press to apply pressure to the pattern material(s) and the base-course material while they are setting in the patterning form and also to use a vibrator or ultrasonic waves to vibrate either or both of the main form and auxiliary form during material charging or product removal.

Use of a water-absorbing or oil-absorbing mat such as shown in FIGS. 12 and 13 is advantageous in that the mat absorbs excess water, lubricant/bonding agent and solvent from portions containing an excess amount of these and supplies them to portions which are deficient in them, thus ensuring uniform water, lubricant/bonding agent and solvent content throughout the shaped article and also reducing the surface water (solvent)-to-cement (resin) ratio so as to promote degassing at the time of pressing. The result is a product of better performance.

As explained in the foregoing, the invention makes it possible to easily produce a patterned concrete shaped article, a patterned ceramic shaped article or a patterned artificial stone shaped article with a pattern course that is exposed over part or the whole of its surface. Since the pattern is formed to a substantial depth below the surface of the shaped article, it does not wear off or become unsightly even when material is removed from the surface of the shaped article by abrasion. The invention further makes it possible to produce a thick shaped article and then slice it into a number of thin shaped articles having the same pattern.

As the pattern course is formed by charging dry pattern material into the auxiliary form disposed within the main form and/or into the form cavity outward of the auxiliary form, the materials can be densely charged without leaving undesirable voids. Moreover, the pattern and base-course materials cave into and fill up the spaces left by removal or dissolution of the auxiliary form, so that the boundaries between the pattern course and the base course are clear-cut and the pattern as a whole is very sharply defined. On the other hand, it is also possible to positively disturb the materials either at the boundaries between them or as a whole (as by stirring) after the pattern material and the base-course material have been charged into the patterning form and the auxiliary form has been removed. Doing this enables the production of shaped articles which resemble marble and other kinds of natural stone. Further, by appropriately selecting the grain size and charging ratio of each charged pattern layer material it is possible to obtain a porous and water permeable pattern course, by appropriately selecting the grain size and charging ratio of each charged base-course layer material it is possible to obtain a porous and water permeable base-course, and by appropriately selecting the grain size and charging ratio of both types of materials it is possible to obtain a porous and water permeable shaped article.

Moreover, if a pattern material should inadvertently be charged at the wrong location, the mistake can easily be remedied since the pattern material is dry at the time of being charged into the patterning form and can thus be sucked up and removed by means of a vacuum cleaner type apparatus.

What is claimed is:

1. A method for producing a patterned concrete shaped article, comprising the steps of:

laying a mat on an inside bottom surface of a main form for molding the shaped article;

disposing at a prescribed position on the mat an auxiliary form of a configuration appropriate for a pattern to be formed, thereby constituting a patterning form in conjunction with the main form;

charging a prescribed amount of dry concrete material for forming a pattern course of the shaped article into said patterning form at a prescribed form cavity portion thereof conforming to a shape of a pattern to be formed;

charging a prescribed amount of a concrete material for forming a base course of the shaped article into the remaining spaces within the patterning form;

removing said auxiliary form from said main form;

setting the dry pattern-course concrete material and the base-course concrete material within said main form into the shaped article with water, wherein said mat laid on the inside bottom surface of the main form permits an absorption of excess water and a supply of excess water to a portion of said dry pattern-course concrete material and said base-course concrete material which lack moisture; and removing the shaped article from said main form.

2. A method according to claim 1, wherein the dry pattern-course concrete material is at least one member selected from the group consisting of cement powder and resin, and the base-course concrete material is a mixture of a fine aggregate and at least one member selected from the group consisting of cement powder and resin.

3. A method according to claim 1, wherein the dry pattern-course concrete material is a mixture of at least one member selected from the group consisting of cement powder and resin, and at least one member selected from the group consisting of a pigment and a fine aggregate; and the base-course concrete material is a mixture of a fine aggregate and at least one member selected from the group consisting of cement powder and resin.

4. A method according to claim 1, wherein said water is supplied into said main form.

5. A method according to claim 1, wherein said water is contained in the base-course concrete material.

6. A method according to claim 1, wherein the mat is a liquid and air-permeable mat.

7. A method according to claim 6, further comprising the step of applying pressure to at least one of the dry pattern-course concrete material and the base-course concrete material after the step of removing said auxiliary form from the main form.

8. A method according to claim 1, wherein said mat is made of non-woven fabric.

9. A method according to claim 6, wherein said mat is made of non-woven fabric.

10. A method according to claim 1, wherein each of said dry pattern-course concrete material and said base-course concrete material contains an inflating agent.

11. A method according to claim 1, further comprising the step of disturbing at least part of said dry pattern-course material and said base-course material after the step of removing said auxiliary form from said main form.

12. A method according to claim 1, wherein said dry pattern course material and base-course material are supplied in their respective amounts capable of making the shaped article water-permeable.

13. A method according to claim 1, further comprising the step of fixing the concrete shaped article onto a surface of an existing concrete substrate.

14. A method according to claim 1, wherein at least one of said main form and said auxiliary form is made of a deformable material and further comprising the step of deforming said at least one form having said dry pattern-course material and base-course material accommodated therein before the step of causing said dry pattern-course material and base-course material to set.

15. A method according to claim 14, wherein said deformable material is rubber, plastic, non-woven fabric or woven fabric.

16. A method for producing a patterned concrete shaped article, comprising the steps of:

laying a mat on an inside bottom surface of a main form for molding the shaped article;

disposing at a prescribed position on the mat a soluble auxiliary form of a configuration appropriate for a pattern to be formed, thereby constituting a patterning form in conjunction with the main form;

charging a prescribed amount of dry concrete material for forming a pattern course of the shaped article into said patterning form at a prescribed form cavity portion thereof conforming to a shape of a pattern to be formed;

charging a prescribed amount of a concrete material for forming a base course of the shaped article into the remaining spaces within the patterning form;

dissolving the soluble auxiliary form;

setting the dry pattern-course concrete material and the base-course concrete material within said main form into the patterned shaped article with water, wherein said mat laid on the inside bottom surface of the main form permits an absorption of excess water and a supply of excess water to a portion of said dry pattern-course concrete material and said base-course concrete material which lack moisture; and removing the patterned shaped article from said main form.

17. A method according to claim 16, wherein said water is supplied into said patterning form.

18. A method according to claim 16, wherein said water is contained in said base-course concrete material.

19. A method for producing a patterned artificial stone shaped article, comprising the steps of:

laying a mat on an inside bottom surface of a main form for molding said shaped article;

disposing at a prescribed position on the mat and within the main form an auxiliary form of a configuration appropriate for a pattern to be formed, thereby constituting a patterning form in conjunction with the main form;

charging a prescribed amount of dry aggregate which is an artificial stone material for forming a pattern course of the shaped article into said patterning form at a prescribed form cavity portion thereof conforming to a shape of a pattern to be formed;

charging a prescribed amount of aggregate which is an artificial stone material for forming a base course of the shaped article into the remaining space within the patterning form;

removing said auxiliary form from said main form;

charging a setting agent into spaces between the pattern-course aggregate and the base-course aggregate to cause the aggregates to set within said main form into the patterned shaped article with said setting agent or with said setting agent under a pressure application, wherein the mat laid on the inside bottom surface of the main form permits an absorption of excess setting agent, a supply of excess setting agent to a portion of the materials which lack setting agent, and a degassing of the material under said pressure application; and removing the patterned shaped article from said main form.

20. A method according to claim 19, wherein said setting agent is one member selected from the group consisting of a blended combination of cement powder and water, a blended combination of cement powder, resin and water, a blended combination of resin and water, and a blended combination of resin and solvent.

21. A method according to claim 19, further comprising the step of disturbing at least part of said dry pattern-course material and said base-course material after the step of removing said auxiliary form from said main form.

22. A method according to claim 19, wherein at least one of said main form and said auxiliary form is made of a deformable material and further comprising the step of deforming said at least one form having said dry pattern-course material and base-course material accommodated therein before the step of causing said dry pattern-course material and base-course material to set.

23. A method according to claim 22, wherein said deformable material is rubber, plastic, non-woven fabric or woven fabric.

24. A method for producing a patterned artificial stone shaped article, comprising the steps of:

laying a mat on an inside bottom surface of a main form for molding said shaped article;

disposing at a prescribed position on the mat and within the main form a soluble auxiliary form of a configuration appropriate for a pattern to be formed, thereby constituting a patterning form in conjunction with the main form;

charging a prescribed amount of dry aggregate which is artificial stone material for forming a pattern course of the shaped article into said patterning form at a prescribed form cavity portion thereof conforming to a shape of a pattern to be formed;

charging a prescribed amount of aggregate which is an artificial stone material for forming a base course of the shaped article into remaining spaces within the patterning form;

dissolving the soluble auxiliary form;

charging a setting agent between the pattern-course aggregate and the base-course aggregate to dissolve said soluble auxiliary form with the setting agent and into the aggregates to cause the aggregates to set within said main form into the patterned shaped article with said setting agent or with said setting agent under a pressure application, wherein the mat laid on the inside bottom surface of the main form permits an absorption of excess setting agent, a supply of excess setting agent to a portion of the aggregates which lack setting agent, and a degassing of the material under said pressure application; and removing the patterned shaped article from said main form.

25. A method for producing a patterned ceramic shaped article, comprising the steps of:

laying a mat on an inside bottom surface of a main form for molding the shaped article;

disposing at a prescribed position on the mat an auxiliary form of a configuration appropriate for a pattern to be formed, thereby constituting a patterning form in conjunction with the main form;

charging a prescribed amount of a ceramic material for forming a pattern course of the shaped article into said patterning form at a prescribed form cavity portion thereof conforming to a shape of a pattern to be formed;

charging a prescribed amount of a ceramic material for forming a base course of the shaped article into remaining spaces within the patterning form;

removing said auxiliary form from said main form;

setting said pattern-course material and base-course material under pressure within said main form into the patterned shaped article with at least one of water and lubricant-bonding agent, wherein the mat laid on the inside bottom surface of the main form permits an absorption of excess water or excess lubricant-agent, a supply of excess water or excess lubricant-bonding agent to a portion of the materials which lack water or lubricant-bonding agent, and a degassing of the materials under said pressure application;

removing the patterned shaped article from said main form; and sintering the patterned shaped article.

26. A method according to claim 25, wherein said at least one of water and lubricant-bonding agent is supplied into said patterning form.

27. A method according to claim 25, wherein said at least one of water and lubricant-bonding agent is contained in said base-course material.

28. A method according to claim 25, wherein said dry pattern-course ceramic material is at least one member selected from the group consisting of clay, particles of rock, particles of glass, and glaze particles; and said base-course ceramic material is at least one member selected from the group consisting of clay, particles of rock, and particles of glass.

29. A method according to claim 25, wherein said dry pattern-course ceramic material is a mixture of at least one member selected from the group consisting of clay, particles of rock, particles of glass and glaze particles and at least one of a colorant; and said base-course ceramic material is at least one member selected from the group consisting of clay, particles of rock, and particles of glass.

30. A method according to claim 25, wherein said dry pattern-course ceramic material is at least one member selected from the group consisting of clay, particles of rock, particles of glass and glaze particles; and said base-course ceramic material is a mixture of at least one member selected from the group consisting of clay, particles of rock and particles of glass and a colorant.

31. A method according to claim 25, wherein said dry pattern-course ceramic material is a mixture of at least one member selected from the group consisting of clay, particles of rock, particles of glass and glaze particles and a colorant; and said base-course ceramic material is a mixture of at least one member selected from the group consisting of clay, particles of rock and particles of glass and a colorant.

32. A method according to claim 25, wherein the mat is a liquid and air-permeable mat.

33. A method according to claim 25, wherein said mat is made of non-woven fabric.

34. A method according to claim 32, wherein said liquid and air-permeable mat is made of non-woven fabric.

35. A method according to claim 25, further comprising the step of disturbing at least part of said dry pattern-course ceramic material and said base-course ceramic material after the step of removing said auxiliary form from said main form.

36. A method according to claim 25, wherein said dry pattern course ceramic material and base-course ceramic material are supplied in their respective amounts capable of making the shaped article water-permeable.

37. A method according to claim 25, wherein at least one of said main form and said auxiliary form is made of a deformable material and further comprising the step of deforming said at least one form having said dry pattern-course ceramic material and base-course ceramic material accommodated therein before the step of causing said pattern-course ceramic material and base-course ceramic material to set.

38. A method according to claim 37, wherein said deformable material is rubber, plastic, non-woven fabric or woven fabric.

39. A method for producing a patterned ceramic shaped article, comprising the steps of:

laying a mat on an inside bottom surface of a main form for molding the shaped article;

disposing at a prescribed position on the mat a soluble auxiliary form of a configuration appropriate for a pattern to be formed, thereby constituting a patterning form in conjunction with the main form;

charging a prescribed amount of dry ceramic material for forming a pattern course of the shaped article into said patterning form at a prescribed form cavity portion thereof conforming to a shape of a pattern to be formed;

charging a prescribed amount of a ceramic material for forming a base course of the shaped article into the remaining spaces within the patterning form;

dissolving the soluble auxiliary form;

setting said pattern-course material and base-course material under pressure within said main form into the patterned shaped article with at least one of water and lubricant-bonding agent, wherein the mat laid on the inside bottom surface of the main form permits an absorption of excess water or lubricant-bonding agent, a supply of excess water or excess lubricant-bonding agent to a portion of the materials which lack water or lubricant-bonding agent, and a degassing of the materials under said pressure application;

removing the patterned shaped article from said main form; and sintering the shaped article.

40. A method according to claim 39, wherein said at least one of water and lubricant-bonding agent is supplied into said patterning form.

41. A method according to claim 39, wherein said at least one of water and lubricant-bonding agent is contained in said base-course material.

42. A method according to claim 20, wherein the setting agent further comprises as blended therewith a powder of at least one of rock, ceramic, new ceramic, glass and plastic.

* * * * *